US012225363B2

(12) United States Patent
Wang et al.

(10) Patent No.: US 12,225,363 B2
(45) Date of Patent: Feb. 11, 2025

(54) SPEAKER MODULE AND WEARABLE DEVICE

(71) Applicant: HTC Corporation, Taoyuan (TW)

(72) Inventors: Sung Jen Wang, Taoyuan (TW); Chien-Hung Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 215 days.

(21) Appl. No.: 18/185,403

(22) Filed: Mar. 17, 2023

(65) Prior Publication Data

US 2023/0403508 A1 Dec. 14, 2023

Related U.S. Application Data

(60) Provisional application No. 63/351,438, filed on Jun. 13, 2022.

(51) Int. Cl.
*H04R 5/02* (2006.01)
*H04R 1/02* (2006.01)
*H04R 1/40* (2006.01)

(52) U.S. Cl.
CPC ............... *H04R 5/02* (2013.01); *H04R 1/025* (2013.01); *H04R 1/403* (2013.01)

(58) Field of Classification Search
CPC ........... H04R 5/02; H04R 1/025; H04R 1/403
USPC ........................................................ 381/300
See application file for complete search history.

(56) References Cited

U.S. PATENT DOCUMENTS

2020/0304905 A1* 9/2020 Oishi ..................... H04R 5/033
2022/0174403 A1 6/2022 Wang et al.
2023/0009102 A1* 1/2023 Wang ....................... H04R 7/04

FOREIGN PATENT DOCUMENTS

CN 114584874 6/2022

OTHER PUBLICATIONS

"Office Action of Taiwan Counterpart Application", issued on Mar. 22, 2024, p. 1-p. 6.

* cited by examiner

*Primary Examiner* — Sean H Nguyen
(74) *Attorney, Agent, or Firm* — JCIPRNET

(57) ABSTRACT

A speaker module is adapted to be configured to a wearable device. The speaker module includes an enclosure and a driving unit. The driving unit is used to generate sound. The enclosure contains the driving unit. A sound sum of the sound output from a front opening, a first rear opening and a second rear opening of the enclosure has directivity. The connection vectors and the inverse vector of the connection normal vector defined by these openings are added to form a combined vector. A unit vector of the combination vector and a unit vector of a front normal vector facing outwards of the front opening are added to form a sum vector. The direction of the sum vector is the direction of the sound sum.

14 Claims, 6 Drawing Sheets

SPEAKER MODULE AND WEARABLE DEVICE

CROSS-REFERENCE TO RELATED APPLICATION

This application claims the priority benefit of U.S. provisional application Ser. No. 63/351,438, filed on Jun. 13, 2022. The entirety of the above-mentioned patent application is hereby incorporated by reference herein and made a part of this specification.

BACKGROUND

Technical Field

The application relates to a speaker module, and in particular, to a speaker module which is adapted to be configured to a wearable device.

Description of Related Art

Current head-mounted display devices usually use earphones or a pair of miniature speakers as sound output. Miniature speakers have a better experience in 3D sound performance and spatial sound field. However, general miniature speakers usually lack the advantages of using headphones. For example, the sound quality changes caused by human factors and wearing differences, and it also lacks the privacy of closed headphones, and there will be more obvious left and right channel interference.

SUMMARY

The application provides a speaker module, and the sum of its output sounds has directivity.

The application provides a wearable device, and the sound sum output by its speaker module has directivity.

A speaker module of the invention is adapted to be configured to a wearable device. The speaker module includes an enclosure and a driving unit. The driving unit is used to generate sound. The enclosure contains the driving unit and has a front opening, a first rear opening and a second rear opening. A sound sum of the sound output from the front opening, the first rear opening and the second rear opening has directivity. The front opening and the first rear opening form a first vector towards the front opening. The front opening and the second rear opening form a second vector towards the front opening. The first rear opening and the second rear opening form a connection normal vector perpendicular to a connection of the first rear opening and the second rear opening and away from the front opening. An inverse vector of the connection normal vector, the first vector and the second vector are added to form a combination vector. The front opening has a front normal vector towards the outside of the enclosure. A unit vector of the combination vector and a unit vector of the front normal vector are added to form a sum vector. A direction of the sum vector is a direction of the sound sum.

The wearable device of the invention includes a frame and at least one speaker module. The speaker module includes an enclosure and a driving unit. The driving unit is used to generate sound. The enclosure contains the driving unit and has a front opening, a first rear opening and a second rear opening. A sound sum of the sound output from the front opening, the first rear opening and the second rear opening has directivity. The front opening and the first rear opening form a first vector towards the front opening. The front opening and the second rear opening form a second vector towards the front opening. The first rear opening and the second rear opening form a connection normal vector perpendicular to a connection of the first rear opening and the second rear opening and away from the front opening. An inverse vector of the connection normal vector, the first vector and the second vector are added to form a combination vector. The front opening has a front normal vector towards the outside of the enclosure. A unit vector of the combination vector and a unit vector of the front normal vector are added to form a sum vector. A direction of the sum vector is a direction of the sound sum.

Based on above, in the present invention, the sum of the sounds output by the speaker module has directivity, which can reduce the deviation caused by the user's wearing variation and the structural difference of the human body. In addition, the directivity can also isolate the voice, making it difficult for outsiders to hear the voice content output by the speaker module, creating a more private use situation, and allowing users to have a more realistic listening experience and a more comfortable use experience. Besides, the sum vector formed by adding the unit vector of the combination vector and the unit vector of the front normal vector provides a more accurate direction for the sound sum output by the speaker module.

DESCRIPTION OF THE EMBODIMENTS

Figure 1:
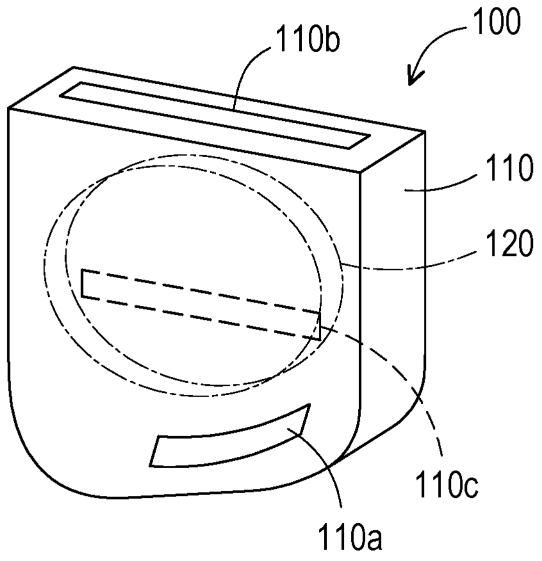
FIG. 1 is a three-dimensional schematic diagram of a speaker module according to an embodiment of the present invention.

Referring to FIG. 1, in the present invention, the speaker module 100 includes an enclosure 110 and a driving unit 120. The driving unit 120 is used to generate sound. The enclosure 110 contains the driving unit 120. The enclosure 110 has a front opening 110*a*, a first rear opening 110*b* and a second rear opening 110*c*. The front opening 110*a* faces the user's head. The first rear opening 110*b* faces upward relative to the user's head. The second rear opening 110*c* faces away from the user's head. A sound sum of the sound output from the front opening 110*a*, the first rear opening 110*b* and the second rear opening 110*c* has directivity.

Figure 2A:
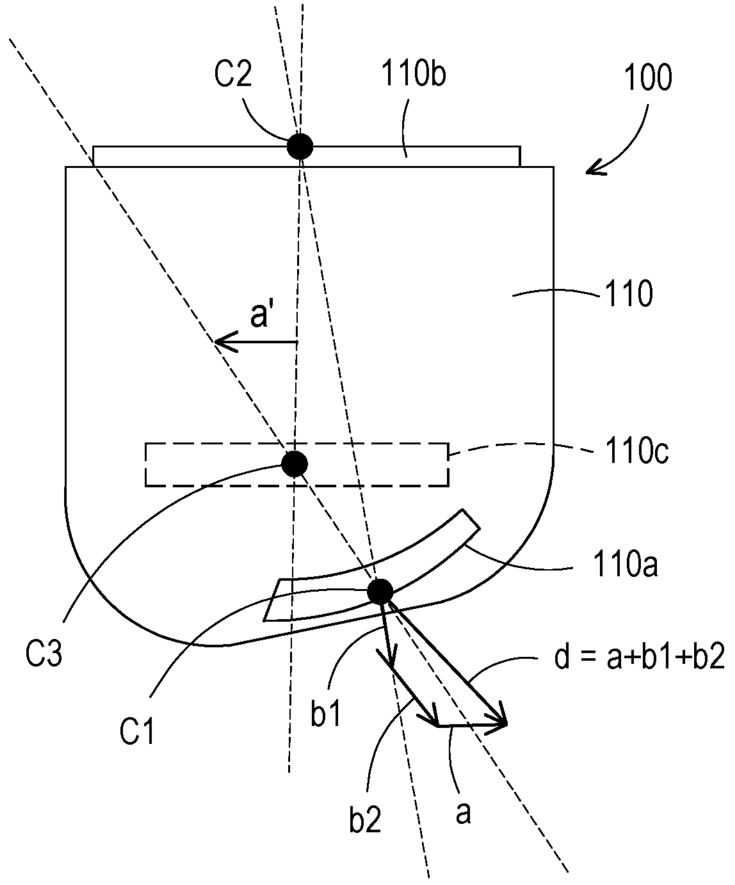
FIG. 2A is a schematic front view of the speaker module in FIG. 1.
Figure 2B:
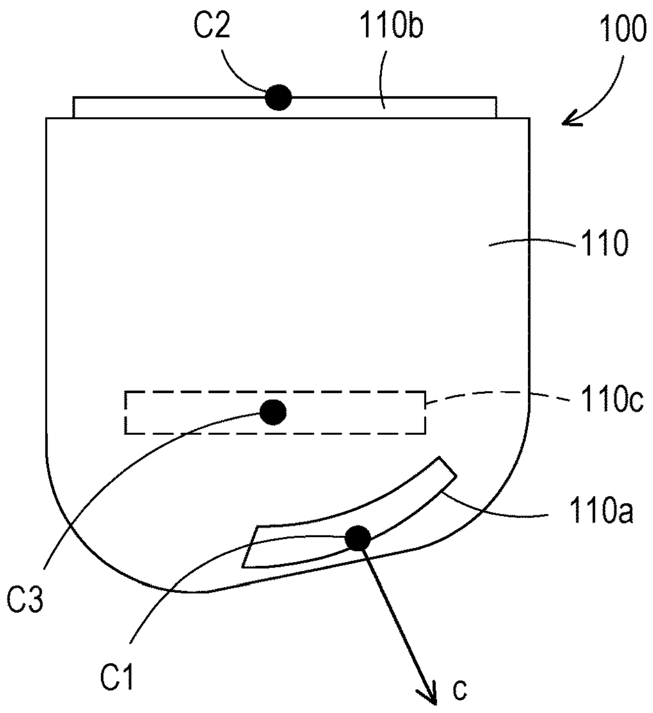
FIG. 2B is a schematic front view of the speaker module in FIG. 1.
Figure 2C:
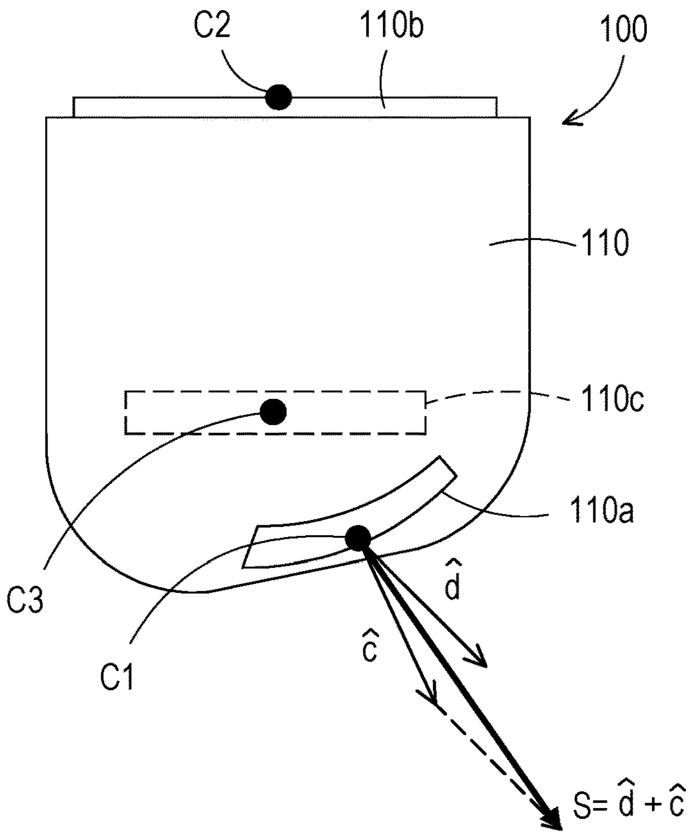
FIG. 2C is a schematic front view of the speaker module in FIG. 1.

Referring to FIG. 2A, the front opening 110*a* and the first rear opening 110*b* form a first vector b1 towards the front opening 110*a*. The front opening 110*a* and the second rear opening 110*c* form a second vector b2 towards the front opening 110*a*. The first rear opening 110*b* and the second rear opening 110*c* form a connection normal vector a' perpendicular to a connection of the first rear opening 110*b* and the second rear opening 110*c* and away from the front opening 110*a*. An inverse vector a of the connection normal vector a', the first vector b1 and the second vector b2 are added to form a combination vector d, wherein d=a+b1+b2. The front opening 110*a* has a front normal vector c towards the outside of the enclosure 110, as shown in FIG. 2B. A unit vector d of the combination vector d and a unit vector e of the front normal vector c are added to form a sum vector S, wherein $S=\hat{d}+\hat{c}$, as shown in FIG. 2C. A direction of the sum vector S is a direction of the sound sum.

Referring to FIG. 2A, FIG. 2B and FIG. 2C again, in the embodiment, the centroid of the front opening 110*a* and the centroid of the first rear opening 110*b* can form the first vector b1 towards the centroid of the front opening 110*a*. The centroid of the front opening 110*a* and the centroid of the second rear opening 110*c* can form the second vector b2 toward the centroid of the front opening 110*a*. The centroid of the first rear opening 110*b* and the centroid of the second rear opening 110*c* can form the connection normal vector a' perpendicular to a connection of the centroid of the first rear opening 110*b* and the centroid of the second rear opening 110*c* and away from the front opening 110*a*. The centroid of the front opening 110*a* may have the front normal vector c towards the outside of the enclosure 110.

Figure 2D:
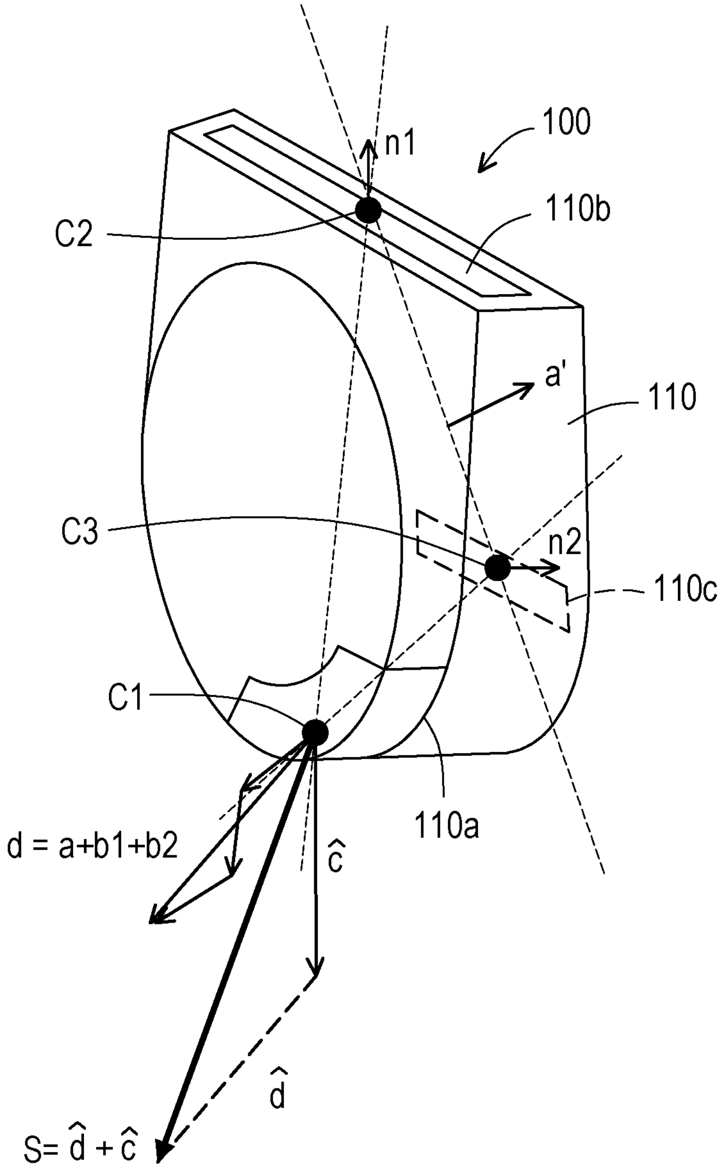
FIG. 2D is a three-dimensional schematic diagram of the speaker module in FIG. 1.

Referring to FIG. 2D, in the embodiment, the centroid of the first rear opening 110*b* has a first rear normal vector n1 towards the outside of the enclosure 110. The centroid of the second rear opening 110*c* has a second rear normal vector n2 towards the outside of the enclosure 110. The plane where the connection normal vector a' is located is coplanar with the plane formed by the first vector b1 and the second vector b2.

Figure 3A:
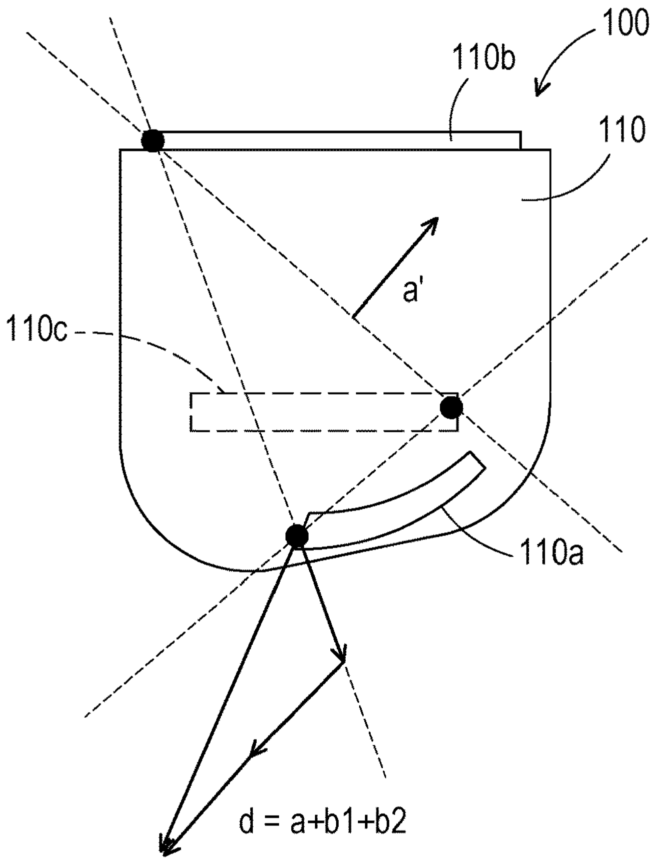
FIG. 3A is a schematic front view of the speaker module in FIG. 1.
Figure 3B:
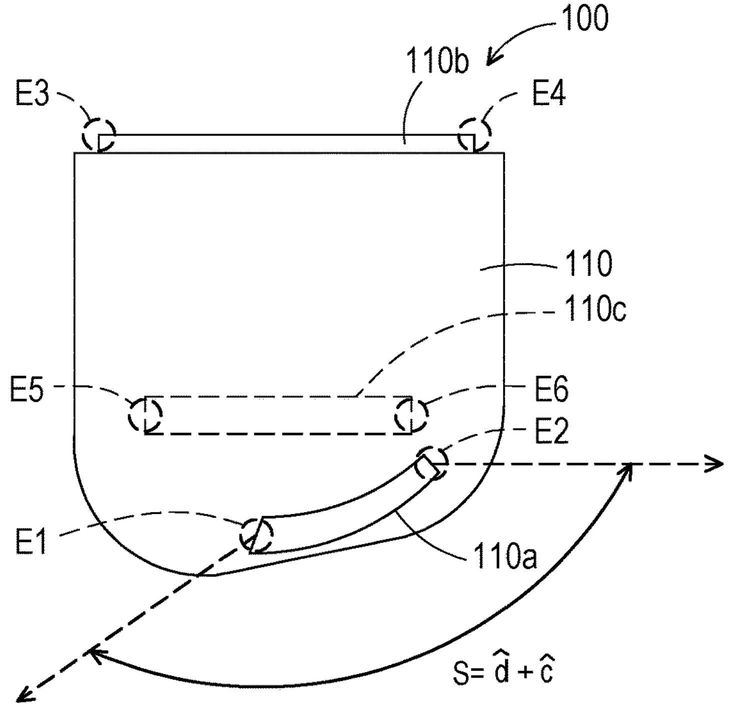
FIG. 3B is a schematic front view of the speaker module in FIG. 1.

Referring to FIG. 3A and FIG. 3B, the sum vector S formed according to any point of the front opening 110*a*, any point of the first rear opening 110*b*, and any point of the second rear opening 110*c* defines an effective area in the front opening 110*a*. For example, the combination of two ends E1 and E2 of the front opening 110*a*, two ends E3 and E4 of the first rear opening 110*b*, and two ends E5 and E6 of the second rear opening 110*c* can compute eight sum vectors S ($S=\hat{d}+\hat{c}$). The sum vectors S can roughly define the boundaries of the effective area.

Referring to FIG. 3A and FIG. 3B again, in the embodiment, the extending direction of the front opening 110*a* may be inclined to the extending direction of the first rear opening 110*b* and the extending direction of the second rear opening 110*c*. Besides, the front opening 110*a* can extend arcuately, and the first rear opening 110*b* and the second rear opening 110*c* can extend linearly.

Figure 4:
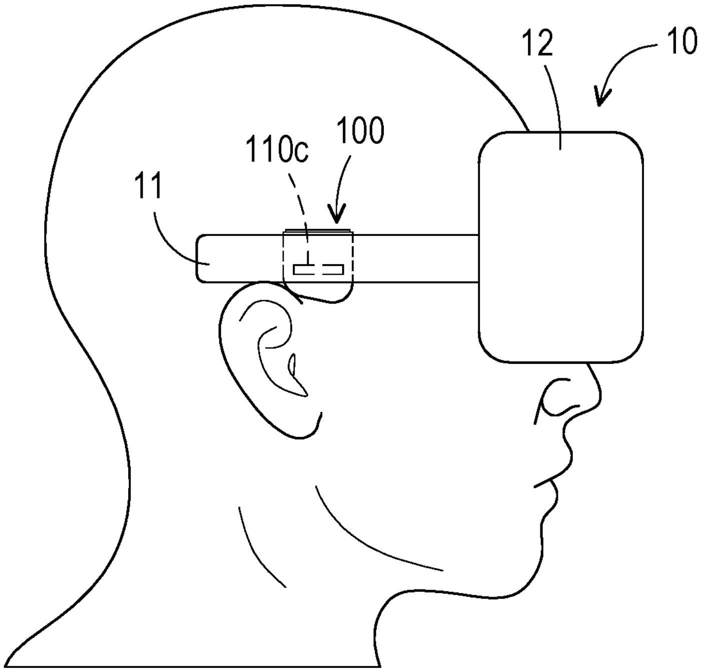
FIG. 4 is a schematic diagram of a wearable device according to an embodiment of the present invention.

Referring to FIG. 4, in an embodiment, a wearable device 10 may include a frame 11, a display unit 12 and a pair of speaker modules 100 as shown in FIG. 1. The display unit 12 is configured to the frame 11. The speaker modules 100 are configured to the frame 11. The wearable device 10 is, for example, a Head Mount Display (HMD). In the embodiment, the speaker modules 100 can be made separately and be detachably, slidably or movably configured to the frame 11, or can be integrated as a part of the wearable device 10.

Figure 5:
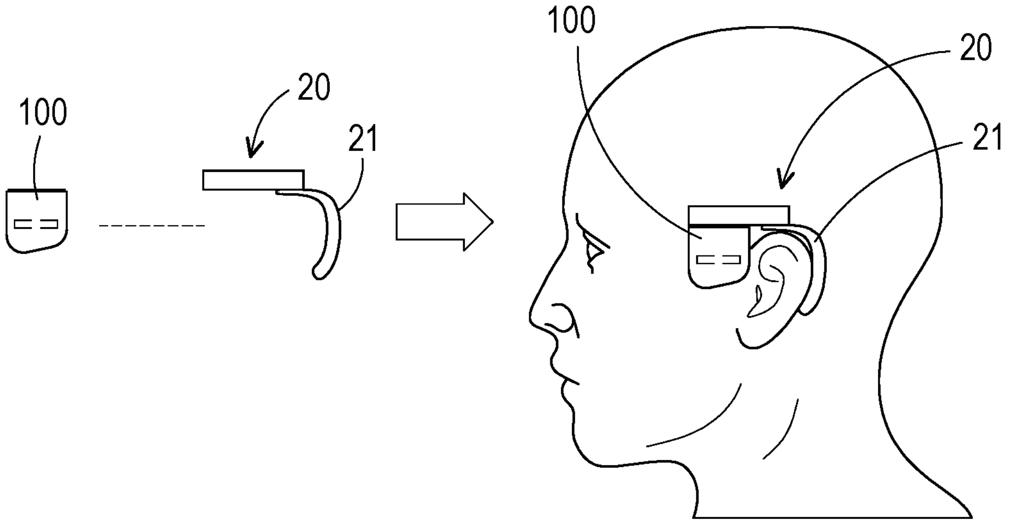
FIG. 5 is a schematic diagram of a wearable device according to another embodiment of the present invention.

Referring to FIG. 5, in another embodiment, the wearable device 20 may include a frame 21 and a speaker module 100. The speaker module 100 is removably configured to the frame 21. The wearable device 20 is, for example, an ear-hook type device.

Figure 6A:
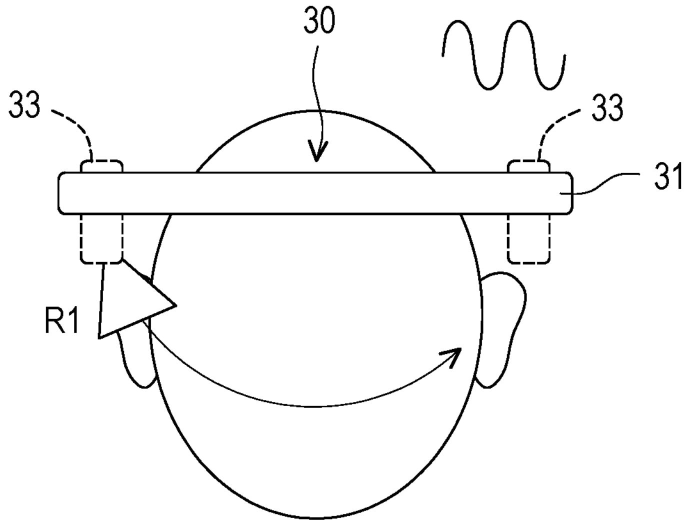
FIG. 6A is a schematic diagram of a wearable device with an associated speaker module outputting sound.

Referring to FIG. 6A, the associated wearable device 30 generally has two associated speaker modules 33 disposed on the left and right sides of the frame 31 of the wearable device 30. Since the associated speaker modules 33 only have a single opening, when the left speaker module 33 outputs sound, a positive sound wave R1 is generated and diffused to the surroundings, and then transmitted to the user's right ear, resulting in interference.

Figure 6B:
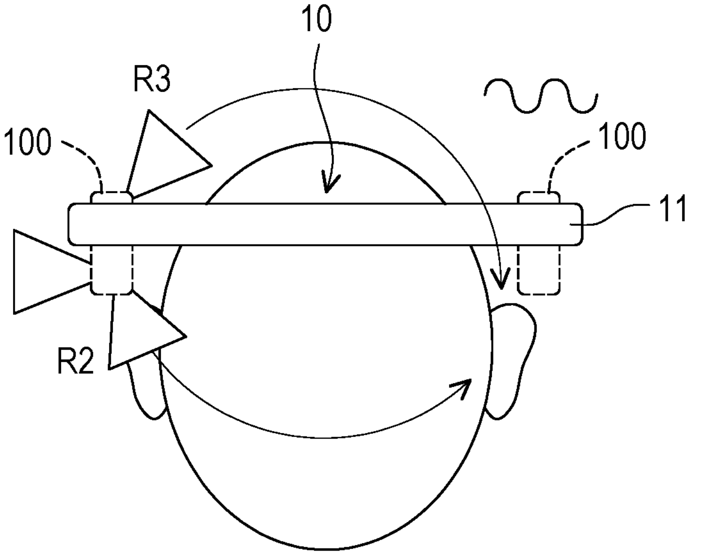
FIG. 6B is a schematic diagram of sound output by the wearable device in FIG. 4.

However, referring to FIG. 4 and FIG. 6B, in the embodiment, each of the speaker modules 100 has the front opening 110*a*, the first rear opening 110*b* and the second rear opening 110*c*. The front opening 110*a* and the first rear opening 110*b* are arranged on the inner side of the wearable device 10 and face the direction of the user's head at a specific angle, so that the sound output by the left speaker module 100 has a positive sound wave R2 and a negative sound wave R3 opposite to the positive sound wave R2. The positive sound wave R2 is output by the front opening 110*a*. The negative sound wave R3 is output by the first rear opening 110*b*. When the negative sound wave R3 and the positive sound wave R2 bypass the user's head and transmit to the right ear, the negative sound wave R3 and the positive sound wave R2 will cancel each other when the user's right ear meets because the transmission distance is close and the sound waves still maintain the opposite phase. Thereby reducing the interference of the right ear by the sound output by the left speaker module. Similarly, when the sound waves of the right speaker module 100 are transmitted to the left ear, they will also cancel each other, reducing the interference caused by the sound output by the right speaker module 100 to the left ear.

In summary, in the present invention, the sum of the sounds output by the speaker module has directivity, which can reduce the deviation caused by the user's wearing variation and the structural difference of the human body. In addition, the directivity can also isolate the voice, making it difficult for outsiders to hear the voice content output by the speaker module, creating a more private use situation, and allowing users to have a more realistic listening experience and a more comfortable use experience. Besides, the sum vector formed by adding the unit vector of the combination vector and the unit vector of the front normal vector provides a more accurate direction for the sound sum output by the speaker module.

What is claimed is:

1. A speaker module, adapted to be configured to a wearable device, the speaker module comprising:

a driving unit, used to generate sound; and an enclosure, contains the driving unit, and has a front opening, a first rear opening and a second rear opening, wherein a sound sum of the sound output from the front opening, the first rear opening and the second rear opening has directivity, the front opening and the first rear opening form a first vector towards the front opening, the front opening and the second rear opening form a second vector towards the front opening, the first rear opening and the second rear opening form a connection normal vector perpendicular to a connection of the first rear opening and the second rear opening and away from the front opening, an inverse vector of the connection normal vector, the first vector and the second vector are added to form a combination vector, the front opening has a front normal vector towards the outside of the enclosure, an unit vector of the combination vector and an unit vector of the front normal vector are added to form a sum vector, and a direction of the sum vector is a direction of the sound sum.

2. The speaker module according to claim 1, wherein a centroid of the front opening and a centroid of the first rear opening form the first vector towards the centroid of the front opening, the centroid of the front opening and a centroid of the second rear opening form the second vector towards the centroid of the front opening, the centroid of the first rear opening and the centroid of the second rear opening form the connection normal vector perpendicular to a connection of the centroid of the first rear opening and the centroid of the second rear opening and away from the front opening, and the centroid of the front opening has the front normal vector towards the outside of the enclosure.

3. The speaker module according to claim 2, wherein the centroid of the first rear opening has a first rear normal vector towards the outside of the enclosure, the centroid of the second rear opening has a second rear normal vector towards the outside of the enclosure, and the connection normal vector is the sum of the first rear normal vector and the second rear normal vector.

4. The speaker module according to claim 1, wherein the sum vector formed according to any point of the front opening, any point of the first rear opening, and any point of the second rear opening defines an effective area in the front opening.

5. The speaker module according to claim 1, wherein an extension direction of the front opening is inclined to an extension direction of the first rear opening and an extension direction of the second rear opening.

6. The speaker module according to claim 1, wherein the front opening extends arcuately, and the first rear opening and the second rear opening extend linearly.

7. A wearable device, comprising:

a frame; and at least one speaker module, configured to the frame, the at least one speaker module comprises:

a driving unit, used to generate sound; and an enclosure, contains the driving unit, and has a front opening, a first rear opening and a second rear opening, wherein a sound sum of the sound output from the front opening, the first rear opening and the second rear opening has directivity, the front opening and the first rear opening form a first vector towards the front opening, the front opening and the second rear opening form a second vector towards the front opening, the first rear opening and the second rear opening form a connection normal vector perpendicular to a connection of the first rear opening and the second rear opening and away from the front opening, an inverse vector of the connection normal vector, the first vector and the second vector are added to form a combination vector, the front opening has a front normal vector towards the outside of the enclosure, an unit vector of the combination vector and an unit vector of the front normal vector are added to form a sum vector, and a direction of the sum vector is a direction of the sound sum.

8. The wearable device according to claim 7, wherein a centroid of the front opening and a centroid of the first rear opening form the first vector towards the centroid of the front opening, the centroid of the front opening and a centroid of the second rear opening form the second vector towards the centroid of the front opening, the centroid of the first rear opening and the centroid of the second rear opening form the connection normal vector perpendicular to a connection of the centroid of the first rear opening and the centroid of the second rear opening and away from the front opening, and the centroid of the front opening has the front normal vector towards the outside of the enclosure.

9. The wearable device according to claim 8, wherein the centroid of the first rear opening has a first rear normal vector towards the outside of the enclosure, the centroid of the second rear opening has a second rear normal vector towards the outside of the enclosure, and the connection normal vector is the sum of the first rear normal vector and the second rear normal vector.

10. The wearable device according to claim 7, wherein the sum vector formed according to any point of the front opening, any point of the first rear opening, and any point of the second rear opening defines an effective area in the front opening.

11. The wearable device according to claim 7, wherein an extension direction of the front opening is inclined to an extension direction of the first rear opening and an extension direction of the second rear opening.

12. The wearable device according to claim 7, wherein the front opening extends arcuately, and the first rear opening and the second rear opening extend linearly.

13. The wearable device according to claim 7, further comprises:

a display unit, configured to the frame.

14. The wearable device according to claim 7, wherein the number of the at least one speaker module is two, the speaker modules are arranged on the left and right sides of the frame, when the sound from the speaker module on the left side is transmitted to the right side, the sound will be canceled by the speaker module on the right side, and when the sound from the speaker module on the right side is transmitted to the left side, the sound will be canceled by the speaker module on the left side.

* * * * *